United States Patent [19]

Kennedy

[11] Patent Number: 4,515,638

[45] Date of Patent: May 7, 1985

[54] STABILIZATION OF THE B-SIDE

[75] Inventor: Richard B. Kennedy, Ridgefield, Conn.

[73] Assignees: Richard J. Fricke; Patrick J. Crehan, both of Ridgefield, Conn.

[21] Appl. No.: 634,786

[22] Filed: Jul. 26, 1984

[51] Int. Cl.³ ............................................. C08G 18/14
[52] U.S. Cl. .................................... 106/162; 106/203; 106/213; 521/109.1
[58] Field of Search ...................... 106/162, 203, 213; 521/109.1

[56] References Cited

U.S. PATENT DOCUMENTS

| | | | |
|---|---|---|---|
| 4,291,129 | 9/1981 | Kennedy | 521/103 |
| 4,400,475 | 8/1983 | Kennedy | 521/103 |
| 4,404,294 | 9/1983 | Wiedermann | 521/107 |

*Primary Examiner*—Maurice J. Welsh
*Attorney, Agent, or Firm*—Wyatt, Gerber, Shoup, Scobey and Badie

[57] ABSTRACT

Polyurethane foams are produced utilizing separate mixtures, the first containing a polyisocyanate, a surfactant and optionally a flame retardant, the second containing a carbohydrate, water and a polyurethane producing amine catalyst, the pH of the second mixture being at least 9.

15 Claims, No Drawings

STABILIZATION OF THE B-SIDE

RELATED PATENTS

This invention relates to improvements in the compositions described and claimed in U.S. Pat. No. 4,400,475 which issued on Aug. 23, 1983.

BACKGROUND OF THE INVENTION

U.S. Pat. No. 4,400,475 the entire disclosure of which is incorporated herein by reference describes the preparation of polyurethane foam compositions by reaction between a polyisocyanate and a carbohydrate in aqueous media in the presence of other reagents such as catalysts, surfactants, and other components normally used in polyurethane foam production.

More specifically, the patent describes the production of polyurethane foams which may contain fire retardants in on site foam uses such as packaging and retrofit building insulation. The reactants are provided in two separate mixtures. The first contains at least the polyisocyanate, the second contains at least the carbohydrate and the polyurethane foam producing catalysts. These mixtures, for convenience have been called, respectively, the A-side and the B-side.

Preferred embodiments of the B-side contain amine catalysts. It has been found that such compositions may have a relatively short shelf life due to inactivation of the catalyst. With some compositions the shelf life may be quite short, for example, up to about three months. If the A-side and the B-side are utilized shortly after preparation, short shelf life is little or no problem. However, if the mixtures are to be stored for intermittent use a short shelf life is unacceptable.

THE INVENTION

It has now been discovered that the shelf life of B-side compositions containing amine type catalysts can be extended to at least six months, and even longer by the additional of sufficient alkaline reagent to achieve a pH in the aqueous solution of at least 9, preferably 9 to 11.

Any of a wide variety of alkaline reagents including inorganic and organic compounds can be employed. Generally weaker bases such as organic amines are preferred. Of the inorganic reagents, weak bases such as sodium carbonate or bicarbonate are preferred. A particularly preferred inorganic reagent is a mixture of sodium metasilicate, sodium sesquircarbonate and sodium perborate. It is available under the trade name Mex from United Gilsonite Laboratories of Scranton, Pa. Primary, secondary or tertiary amines can be employed. The preferred organic amines are triethanolamine, and 2-amino-2-methyl-1-propanol.

Those skilled in the art will recognize that certain amines, such as triethanolamine can be employed both as a catalyst and as a stabilizing agent. Thus if the B-side contains such a catalyst, the amount will be about 5 to 10% by weight based on the total weight. About half will function as a catalyst, the balance as a stabilizer. If only a catalytic quantity is employed, the shelf life of the mixture will be short.

The final products produced using the products of this invention are polyurethane foams formed by reaction between a polyisocyanate and an aqueous slurry or solution of carbohydrate such as cornstarch, corn syrup, fructose, dextrose, sucrose, molasses, cellulose and the like, in the presence of a surfactant and the polyurethane producing catalyst. Conventional additives such as flame retardants, surfactants, pigments, dyes, clays and other organic fillers, and the like may also be present.

Typical flame retardants which may be employed include, for example, sodium chloride, calcium chloride, borax, alkalimetal borates, tricresyl phosphate, tris(2-chloroethyl)phosphate, tris(chloropropyl)phosphate, O,O-diethyl-N,N-bis(2-hydroxyethyl)aminomethyl phosphate, metal oxides and chlorides such as antimony oxide, alumina, and antimony oxychloride.

The preferred carbohydrates are untreated carbohydrates, that is, carbohydrates which have not been treated to prevent oxidation or to block any of the functional groups, e.g. oxyalkylation of hydroxyl groups. The expression "untreated" refers to carbohydrates in which substantially all of the hydroxyl groups are free.

As in the usual foaming procedure, heat generated by the exothermic polymerization reaction causes the water present in the reaction mixture to vaporize. The vapors become entrapped in the foaming mixture as it rises to form the desired cellular structure. Varying the amount of water in the reaction system is one type of control procedure used to modify the density and cell structure of the foams to produce products which may be employed for such divergent uses as household sponges, hair curlers, cushions, packing materials, structural materials, and flotation apparatus.

The foams produced using the novel mixtures of the present invention are especially useful to retrofit buildings with insulation. For this use, they will usually be prepared in rigid form and will contain flame retardants. A particular advantage of such foams is that, unlike most polyurethane foams which melt and collapse when they are exposed to flame, the foams of this invention tend to maintain their cell structure even when exposed to high temperatures. The foams of the present invention used for retrofit purposes can be prepared under conditions which will generate very low pressure during production so that they can conveniently be used as foam-in-place insulation for existing structures. The foams of the present invention can be produced in rigid, semirigid and flexible form.

Polyisocyanates, which can be used in the present invention include, for example, methylenediisocyanate; tolylene-2,4-diisocyanate; polymethylene polyphenyl isocyanate; tolylene-2,6-diisocyanate; diphenylmethane 4,4'-diisocyanate, 3-methyldiphenylmethane-4,4'diisocyanate' m- and p-phenylenediisocyanate; naphthalene-1,5-diisocyanate; and mixtures of these products. Either crude or pure isocyanates can be used. A prepolymer polymeric isocyanate which can be prepared by the reaction of an excess of polyisocyanate with a lesser amount of a carbohydrate polyol having more than two hydroxyl groups per molecule can be used in this invention. The combined use of more than two polyisocyanates is also possible.

Water is used with the carbohydrate in the present invention to provide a carrier for the carbohydrates and inorganic salts, and as explained above, is a blowing agent. The amount of water in some formulations is kept at the low end of the hereinafter described range to prevent "sighing", i.e., the collapse of the foam, as well as to aid in the reduction of the pressure of the foaming reaction.

The water in the reaction mixture causes the evolution of carbon dioxide by the reaction of water with isocyanate. The carbon dioxide functions as a blowing agent. For the purpose of adjusting the density of the rigid foams, auxiliary blowing agents such as low boiling hydrocarbons, carbon dioxide, or halohydrocarbons such as chlorofluoroalkanes can be utilized in the reaction mixture. This is analogous to the conventional preparation of polyurethane foams, and the same auxiliary blowing agents are employed. Suitable blowing agents will, as is known, be chemically inert toward the reactants and have boiling points below 100° F., preferably from −50° F. to 70° F. Suitable halohydrocarbons include methylene chloride, ethylene trichloride, trichloromonofluoromethane, dichlorodifluoromethane, and dichlorotetrafluoroethane.

For the preparation of the foams of this invention, the B-side may be added to the reaction mixture in the form of an aqueous slurry or solution, which will hereinafter be referred to as a "syrup". The carbohydrate may be cornstarch, cellulose, corn syrup, dextrose, fructose, sucrose, pectin, alginates, guar gum, molasses, or the like. The carbohydrate mixture which presently appears to be most suitable is corn syrup, a mixture of sucrose and dextrose, and about 40% fructose. The high-fructose corn syrup is less viscous than regular corn syrup and thus can be poured more readily. In addition, the syrup containing fructose gives a lower density foam with more and smaller cells.

The preferred carbohydrates employed in this invention are water soluble, mono- and disaccharides such as glucose, fructose and sucrose. These are the most readily available carbohydrates, the easiest to react in aqueous media, and presently appear to give the most satisfactory products, especially for packaging foams.

Oligo and polysaccharides may also be used to produce useful foams.

The foams of this invention can be prepared by the usual on site foaming procedures used with conventional polyols. The usual amine polyurethane producing catalysts employed in these procedures are also applicable with the process of this invention. These include certain tertiary amine catalysts such as aliphatic tertiary amines, N-substituted morpholines and N,N'-substituted piperazines; more specifically, triethylamine, dimethylaminoethanol, diethycyclohexylamine, lauryldimethylamine, triethanolamine, tetrakis(2-hydroxypropyl)ethylenediamine, N,N,N',N'-tetramethylethylenediamine, N-methylmorpholine, N-ethyl-morpholine, 2,2,2-(diazabicyclooctane)triethylenediamine, 1,2,4-trimethylpiperazine, triethylenediamine, 2-methylimidazole, 1,2-dimethyl imidazole, and other polyurethane producing catalysts known to those skilled in the art.

Other catalysts which have been found to be particularly useful in the present invention are aminohydroxy compounds, such as 2-amino-2-methyl-1-propanol, tris(hydroxymethyl)aminomethane, and 2-amino-2-ethyl-1,3-propanediol.

Surfactants which whave been found useful in the present invention include, for example, Dow Corning (R) 925098 also known as DC 5098, which is a nonhydrolyzable silicone glycol copolymer. Union Carbide's RL 5420 and 5340 are other nonhydrolyzable silicone glycol copolymer which may be used. Other surfactants include Air Products' LK-221 (R), LD-332, and LK-443, all organic surfactants which can be used as a total replacement for the usual silicone surfactants. Other Dow Corning silicone surfactants which can be used in foams made according to the present invention include Dow Corning 190, 191,193, 196,197, 198, 1312, F-11-630, 1315, Q2-5023 and Q2-5103.

In the presently preferred process for the production of foams in accordance with this invention, two separate mixtures are first prepared and then blended together. The first mixture is a combination of isocyanate and surfactant. If a flame retardant is employed, it is incorporated in this first mixture. The second mixture which is a composition of this invention contains the carbohydrate, the catalyst and water together with a sufficient amount of alkaline reagent so that the pH is at least 4. Carbohydrate syrups are commercially available containing varying amounts of water, up to about 30% by weight. These syrups can be employed with or without the addition of supplemental water. Alternatively, a dry carbohydrate may be taken up in the selected amount of water. In any event, the pH is adjusted by the addition of alkaline reagent.

The final foaming mixture of this invention will normally contain from about 5 to 30% polyisocyanate, 0.05 to 0.4% surfactant, 5 to 30% water, 30 to 60% dry carbohydrate, 0.5 to 2.5% catalyst, all by weight based on the total weight. As stated above, there may be components in the mix such as flame retardants, plasticizers, dyes, pigments and the like. The amount of flame retardants on a percent by weight basis is 5 to 11%.

The desired quantities of each component in the final mix can be obtained by mixing the first mixture with the second mixture at a first to second ratio of from about 0.75:1 to 2:1 by weight, if the mixtures contain the following components in parts by weight based on the total weight of each mixture.

First Mixture 5 to 200 parts by weight polyisocyanate
0.1 to 2.0 parts by weight surfactant
5 to 75 parts by weight flame retardant (optional)

Second Mixture 25 to 120 parts by weight carbohydrate
0.5 to 5 parts by weight catalyst
0.1 to 10 parts by weight auxiliary blowing agent (optional)
up to 30 parts by weight water As aforesaid, a portion of the water may be provided as the carrier for the carbohydrate, as in the case of commercial syrups.

There may be appreciable variation from the above defined quantities without substantial adverse effect on the reaction or on the products produced.

To make a foam using a B-side composition of the present invention, the mixture of isocyanate and the mixture of carbohydrate syrup are thoroughly mixed together. The resulting mixture, which is liquid, may be introduced into a mold or behind a wall to form the foam into the desired shape. The ingredients can be combined in a commercially available mixing gun for introduction into a mold. The procedures employed are, in fact, the same procedures which are applicable to the on site preparation of foams.

The mixing ratio of isocyanate mix to carbohydrate mix is from 0.75:1 to 2:1, preferably 1:1 to 1.5:1, by weight.

The following non-limiting examples are given by way of illustration only.

EXAMPLE 1

A B-side mixture for use in the preparation of a polyurethane foam was prepared by mixing
High fructose corn syrup—96 pbw
Triethanolamine (85% in water)—2 pbw
Dabco-T—2 pbw The mixture was allowed to stand for about 30 minutes and the Dabco-T added. The pH of the mixture is 9.5 to 9.6 and it stays in this range for at least 6 months. When mixed with the A-side of Example 2, a useful polyurethane foam is prepared.

EXAMPLE 2

A B-side mixture for use in the preparation of polyurethane foam was prepared by mixing the following ingredients:
High fructose corn syrup—99.97 pbw
Mex—0.0025 pbw
Dabco-T—0.03 pbw The catalyst was added after the mixture was allowed to stand for about 30 minutes.

This mixture with a pH of about 9.5 is stored for nine months and thereafter mixed with an A-side containing 100 pbw polymethylene polyphenyl isocyanate (Mobay, Mondur MR), 1 pbw Dow Corning DC 5098 silicone surfactant and 20 ppw Stauffer FYROL CEF, tris(2-chloroethyl)phosphate flame retardant. The final mixture is poured into a mold where it foamed and provided excellent bonding to all surfaces of the mold.

EXAMPLE 3

A first mixture of 50% corn syrup (1132, Corn Products, Englewood Cliffs, N.J.) and 0.7% Mex is prepared. This mixture is blended with a second mixture containing 75% sucrose, 25% water and 4.7% Mex. The resulting mix is allowed to stand for 30 minutes and sufficient Dabco-T is added to produce a B-side with 2% by weight Dabco-T and a pH of about 9.5. It is stable for more than six months. When mixed with the A-side of Example 2, a useful polyurethane foam is produced.

EXAMPLE 4

Example 3 is repeated except that the second mixture contains 55.56% sucrose and 44.44% water. The resulting B-side is stable for at least six months and is thereafter used with the A-side of Example 2 to produce a useful polyurethane foam. The pH of the B-side is above 9.

EXAMPLE 5

Example 3 is repeated except that the second mixture contains 55.56% sucrose and 44.44% water. The resulting B-side is stable for at least six months and is thereafter used with the A-side of Example 2 to produce a useful polyurethane foam. The pH of the B-side is above 9.

EXAMPLE 6

Example 3 is repeated except that the Mex is replaced with triethanolamine which is added after the first and second mixtures are blended. The final concentration of amine is 5%. The resulting B-side is stable for at least six months and is thereafter mixed with the A-side of Example 2 to produce a useful polyurethane foam. The pH of the B-side is above 9.

What is claimed is:

1. A mixture useful for the preparation of polyurethane foams comprising an untreated carbohydrate in which substantially all of the hydroxyl groups are free, water, and a polyurethane producing amine catalyst, the pH of said mixture being at least 9 because of the presence of an alkaline reagent.

2. A mixture as in claim 1 comprising from 25 to 120 parts by weight carbohydrate, 0.5 to 5 parts by weight catalyst and up to 30 parts by weight water, all based on the total weight.

3. A mixture as in claim 1 or 2 wherein the pH is from 9 to 11.

4. A mixture as in claim 1 or 2 wherein the alkaline reagent is an amine.

5. A mixture as in claim 1 or 2 wherein the alkaline reagent is triethanol amine or 2-amino-2-methyl-1-propanol.

6. A mixture as in claim 1 or 2 wherein the alkaline reagent is inorganic.

7. A mixture as in claim 1 or 2 wherein the alkaline reagent is sodium carbonate.

8. A mixture as in claim 1 or 2 wherein the alkaline reagent is a mixture of sodium metasilicate, sodium sesquicarbonate and sodium perborate.

9. A mixture as in claim 1 or 2 wherein the carbohydrate is selected from the group consisting of cornstarch, cellulose, corn syrup, dextrose, sucrose and molasses.

10. A mixture as in claim 1 or 2 wherein the carbohydrate is cornstarch.

11. A mixture as in claim 1 or 2 wherein the carbohydrate is corn syrup.

12. A mixture as in claim 1 or 2 wherein the catalyst is selected from the group consisting of triethylamine, dimethylaminoethanol, diethylcyclohexylamine, lauryldimethylamine, triethanolamine, tetrakis(2-hydroxypropyl)ethylenediamine, N,N,N',N'-tetramethylethylenediamine, N-methyl morpholine, N-ethyl morpholine, 2,2,2-(diazabicyclooctane)triethylenediamine, 1,2,4-trimethylpiperazine, triethylenediamine, 2-methylimidazole, 1,2-dimethyl imidazole, 2-amino-2-methyl-1-propanol, tris-(hydroxymethyl)aminomethane, 2-amino-2-ethyl-1,3-propanediol.

13. A mixture as in claim 1 or 2 wherein the carbohydrate is selected from the group consisting of cornstarch, cellulose, corn syrup, dextrose, sucrose and molasses, and the catalyst is selected from the group consisting of triethylamine, dimethylaminoethanol, diethylcyclohexylamine, lauryldimethylamine, triethanolamine, tetrakis(2-hydroxypropyl)ethylenediamine, N,N,N',N'-tetramethylethylenediamine, N-methyl morpholine, N-ethyl morpholine, 2,2,2-(diazbicyclooctane)triethylenediamine, 1,2,4-trimethylpiperazine, triethylenediamine, 2-methyl imidazole, 1,2-dimethyl imidazole, 2-amino-2-methyl-1-propanol, tris(hydroxymethyl)aminomethane, 2-amino-2-ethyl-1,3-propanediol.

14. A mixture as in claim 1 or 2 wherein the carbohydrate is corn syrup and the catalyst is selected from the group consisting of lauryldimethylamine, triethanolamiine, tetrakis(2-hydroxypropyl)ethylenediamine, N,N,N',N'-tetramethylethylenediamine, N-methyl morpholine, N-ethyl morpholine, 2,2,2-(diazibicyclooctane)triethylenediamine, 1,2,4-trimethylpiperazine, triethylenediamine, 2-methyl imidazole, 1,2-dimethyl imidazole, 2-amino-2-methyl-1-proponol, tris-(hydroxymethyl)aminomethane, 2-amino-2-ethyl-1,3-propanediol.

15. A mixture as in claim 1 or 2 wherein the carbohydrate is corn syrup and the catalyst is selected from the group consisting of triethylamine, dimethylaminoethanol, diethycyclohexylamine, lauryldimethylamine, triethanolamine, tetrakis(2-hydroxypropyl)ethylenediamine, N-methyl morpholine, N-ethyl morpholine, 2,2,2-(diazobicyclooctane)trimethylenediamine 1,2,4-trimethylpiperazine, triethylenediamine, 2-methyl imidazole, 1,2-dimethyl imidazole, 2-amino-2-methyl-1-propanol, tris(hydroxymethyl)aminomethane, 2-amino-2-ethyl-1,3-propanediol.

* * * * *